(12) United States Patent
Adams

(10) Patent No.: US 6,594,366 B1
(45) Date of Patent: Jul. 15, 2003

(54) HEADSET/RADIO AUTO SENSING JACK

(75) Inventor: Joel Adams, Pflugerville, TX (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 08/982,943

(22) Filed: Dec. 2, 1997

(51) Int. Cl.⁷ .............................. H04B 1/40; H04B 1/38
(52) U.S. Cl. ..................... 381/74; 455/575; 455/568
(58) Field of Search ..................... 379/433, 110.01, 379/387, 457, 430, 434; 381/74; 455/66, 568, 575, 569, 90, 556, 550; 439/188, 489

(56) References Cited

U.S. PATENT DOCUMENTS

| 4,335,281 | A |   | 6/1982  | Scott et al. ............. 179/156 A |
|-----------|---|---|---------|---------------------------------------|
| 4,481,382 | A | * | 11/1984 | Ville-Real ................... 455/556 |
| 4,524,461 | A | * | 6/1985  | Kostanty et al. .............. 455/79  |
| 4,591,661 | A | * | 5/1986  | Benedetto et al. .......... 455/556   |
| 4,634,816 | A |   | 1/1987  | O'Malley et al. ........... 379/430   |
| 4,658,242 | A | * | 4/1987  | Zeder ....................... 340/568.4 |
| 4,720,857 | A |   | 1/1988  | Burris et al. ................ 379/430 |
| 5,117,461 | A |   | 5/1992  | Moseley ...................... 381/72  |
| 5,341,254 | A | * | 8/1994  | Ueno .......................... 360/62  |
| 5,369,857 | A |   | 12/1994 | Sacherman et al. .......... 29/594   |
| 5,655,025 | A | * | 8/1997  | Kim et al. ..................... 381/11 |
| 5,822,406 | A | * | 10/1998 | Brown ........................ 379/88  |
| 5,910,991 | A | * | 6/1999  | Farrar ......................... 381/59 |
| 5,978,689 | A | * | 11/1999 | Tuoriniemi et al. ......... 455/569  |

\* cited by examiner

Primary Examiner—Forester W. Isen
Assistant Examiner—Brian Pendleton

(57) ABSTRACT

A headset/headphone sensing jack (203, 208, 210). A two-channel sensing circuit (210) is provided which detects whether a headphone (101) or headset (103) is installed. By employing an impedance sensing circuit (210), it is possible to use a single common 2.5 mm jack (120) for both radio and telephony operation. Formerly, two separate jacks would be required for both functions. An electronic device (50) according to the present invention is further capable of switching between AM/FM radio and telephone modes depending on whether a particular headpiece (101, 103) is installed.

17 Claims, 3 Drawing Sheets

HEADSET/RADIO AUTO SENSING JACK

BACKGROUND OF THE INVENTION

1. Field of the Invention

The present invention relates to sensing circuits and, particularly, to circuits for sensing audio input/output plugs.

2. Description of the Related Art

Portable electronic devices, such as cellular telephones and portable radios, are well known. It is further known to provide electronic devices having combined telephone and AM/FM radio functionality. Once clipped into position onto a user's person (such as via a belt clip or armband), such devices may be used with greater freedom by way of attachable headpieces. For example, in the case of a cellular telephone, a headset may include a pair of earphones with a boom microphone extending towards the user's mouth. Such headsets usually provide a channel for the microphone and a channel for mono- or bi-naural audio output to the speakers. Similarly, stereo headphones, providing left and right stereo channels, for use with portable AM/FM radios are well known.

Telephone headsets and stereo headphones are typically designed mechanically to use the same 2.5 millimeter two-channel plug and jack. However, the telephone headset and the stereo headphones require different electrical signal and pin configurations. Thus, in order to provide both AM/FM radio and cellular telephone functionality, an electronic device must generally be provided with one 2.5 millimeter jack for receiving the stereo headphone plug and another for receiving the telephone headset plug. Such devices may further include circuitry for sensing the presence or absence of a single plug. However, no jacks are known for sensing two different plugs.

Accordingly, there is a need for a single jack which can detect the presence of either a telephone headset or stereo headphones and provide either telephone functionality or radio functionality in response to their detection.

SUMMARY OF THE INVENTION

These problems in the prior art are overcome in large part by a headset/headphone sensing jack according to an embodiment of the present invention. A two-channel sensing circuit is provided which detects whether a headphone or headset is installed. By employing an impedance sensing circuit, it is possible to use a single common 2.5 mm jack for both radio and telephony operation. Formerly, two separate jacks would be required for both functions.

A sensing circuit is provided which includes one or more comparators for detecting whether a headphone or headset is installed. The comparator compares impedance levels to a predetermined reference taking advantage of the two different impedances of the devices. More particularly, if a headpiece is installed a low impedance is detected; when a headpiece is not installed a high impedance is detected. Typically, a sensing circuit is provided for two channels (e.g., left and right stereo, or microphone and audio output). If both channels are at low impedance, then the stereo headphones are installed. When only one channel is at low impedance, then the other channel is the microphone input and a telephone headset is installed. If neither channel is at low impedance, then nothing is installed. An electronic device according to the present invention is further capable of switching between AM/FM radio and telephone modes depending on whether a particular headpiece is installed.

BRIEF DESCRIPTION OF THE DRAWINGS

A better understanding of the present invention is obtained when the following detailed description is considered in conjunction with the following drawings in which.

DETAILED DESCRIPTION OF THE INVENTION

Figure 1:
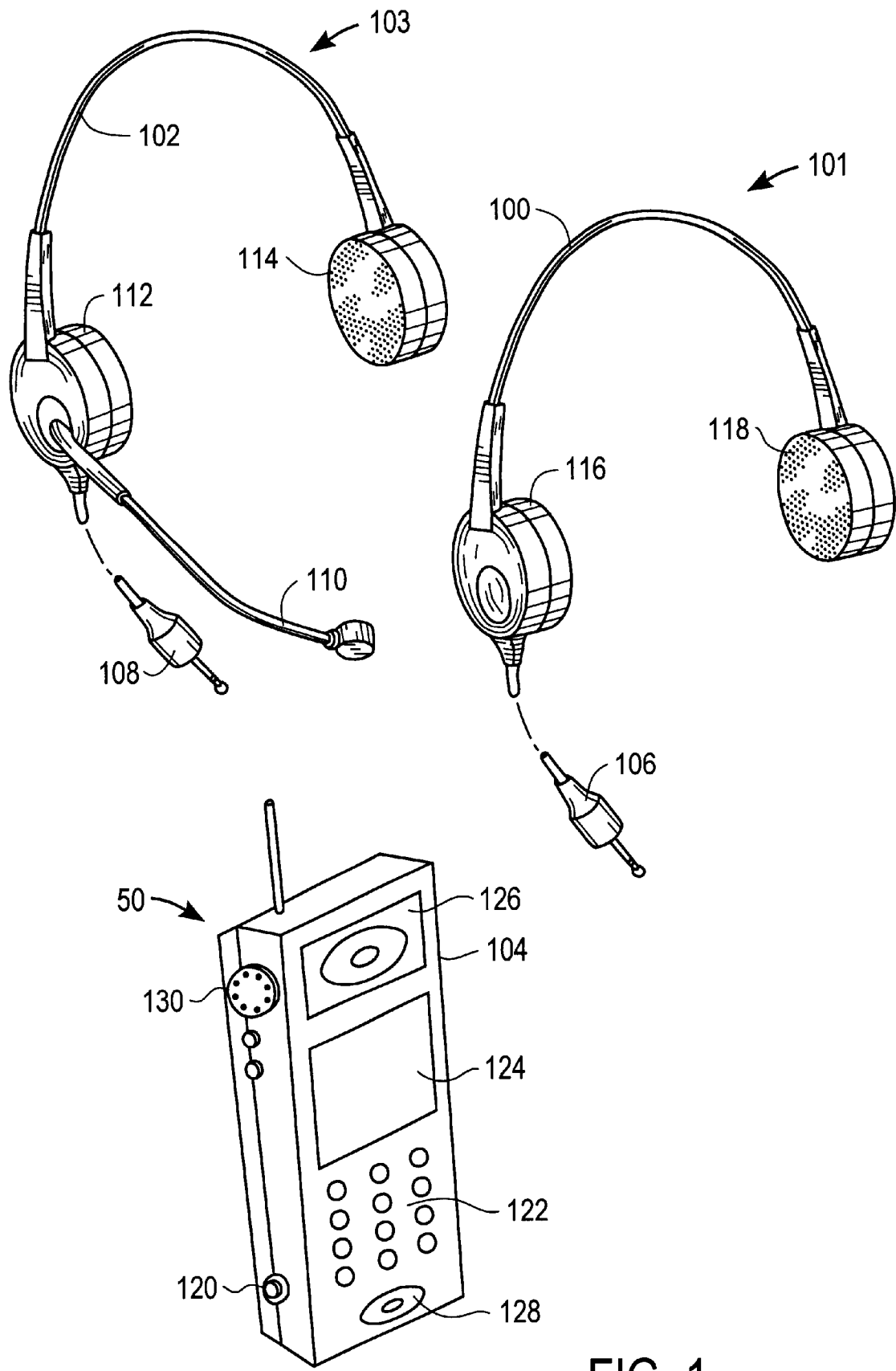
FIG. 1 is a diagram illustrating a combined telephone and radio configured to receive headphones or headsets in a single jack according to an embodiment of the present invention.

Turning now to the drawings and with particular attention to FIG. 1, a diagram of an electronic device having a single receptacle and configured to sense the presence of a stereo headphone or cellular telephone headset plug is shown. The electronic device 50 includes both cellular telephone and AM/FM radio functionality as will be described in greater detail below. Externally, the electronic device 50 includes a keypad 122 for inputting telephone numbers, a view screen 124 which may be used, inter alia, for displaying a phone list and displaying the numbers which are keyed in using the keypad 122, a housing speaker 126 and a housing microphone 128. In addition, the electronic device 50 may include separate controls 130 for operating the integrated AM/FM radio. Finally, a jack 120 is provided which is configured to receive a plug from either a stereo headphone 101 or cellular telephone headset 103. In particular, the stereo headphone 101 includes a headband piece 100 which couples to a pair of earphones 116, 118. As is well understood in the art, the earphones provide left and right stereo channels. The stereo headphones 101 couple to the electronic device 50 via a plug 106 insertable into the jack 120. As will be described in greater detail below, the electronic device 50 is configured to be able to detect the plug 106 and provide AM/FM stereo radio functionality to the stereo headphone 101. When an incoming telephone call is received, the electronic device 50 is further capable of disconnecting the AM/FM radio functionality and permitting the user to answer the telephone in the conventional manner (i.e., using the housing microphone and speaker 128, 126 respectively).

FIG. 1 further illustrates a telephone headset 103 which may be a cellular telephone headset. The cellular telephone headset 103 includes a headband piece 102 which couples together a pair of earphones 112, 114. In addition, a boom microphone 110 may be provided coupled to one of the earphones 112. The cellular telephone headset 103 couples to the electronic device 50 by way of a plug 108. The cellular telephone headset 103 may be operable to provide an AM/FM radio output, but typically only in a monophonic or binaural mode. Thus, as in the case of the stereo headphones, two-channel functionality is provided, but here a single output channel and a single input channel are provided, rather than two output channels. As will be described in greater detail below, the electronic device 50 may provide monophonic or binaural AM/FM radio functionality to the cellular telephone headset 103; when an incoming telephone call is received, the AM/FM radio functionality is disabled and the microphone 110 input is re-enabled.

The plugs 106, 108 are both typically 2.5 millimeter plugs, but having different signal and pin configurations. As will be discussed in greater detail below, the electronic device 50 is configured to be able to detect the insertion of the plug 108 and distinguish it from the insertion of the plug 106.

Figure 2:
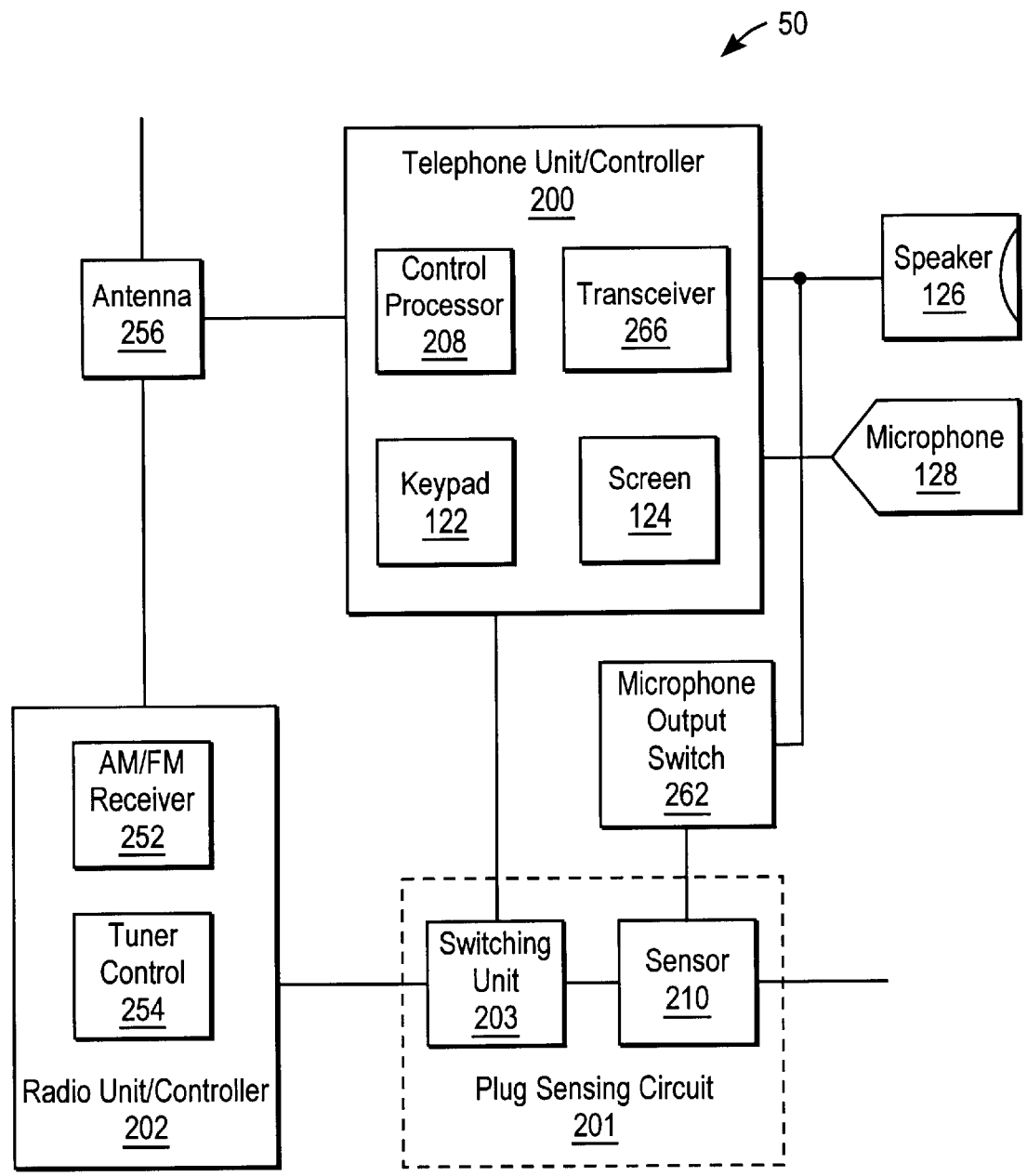
FIG. 2 is a block diagram of the combined telephone/radio of FIG. 1.

Turning now to FIG. 2, a block diagram of the electronic device 50 is shown. In particular, the electronic device 50 includes a telephone unit or communication controller 200, as well as an AM/FM radio unit or radio controller 202. The telephone unit may be a cellular telephone unit, for example. Both the AM/FM radio unit 202 and the cellular telephone unit 200 are coupled to an antenna 256. The antenna 256 may be a dual-use antenna such as are well known in the art. Alternatively, separate antennae may be provided for the AM/FM radio unit 202 and for the cellular telephone unit 200. Thus, FIG. 2 is exemplary only.

The cellular telephone unit 200 includes a control processor 208 coupled to a transceiver 266 for providing modulation and demodulation as well as digital-to-analog and analog-to-digital conversion. The control processor 208 is configured to provide supervision over cellular telephone functions such as device identification and cell-switching. In addition, the control processor 208 is configured to supervise switching between cellular telephone and AM/FM radio functionality, as will be discussed in greater detail below. In addition, a screen 124 and a keypad 122 are coupled to the control processor 208. A housing speaker 126 and a housing microphone 128 are further coupled to the cellular telephone unit 200.

The AM/FM radio unit 202 includes an AM/FM receiver 252 which may include digital-to-analog converters as well as AM/FM demodulators. An AM/FM radio tuner control unit 254 is also provided.

Both the cellular telephone unit 200 and the AM/FM radio unit 202 are coupled to a plug sensing circuit 201. The plug sensing circuit 201 includes a sensor 210 coupled to switching unit 203. As will be described in greater detail below, the sensor 210 includes a circuit or circuits to detect the presence of one or more types of 2.5 millimeter plugs. The switching unit 203, in turn, is configured to respond to outputs from the sensing unit 210 to switch between AM/FM radio 202 and cellular telephone 200 output and input functionality. Finally, a microphone switch 262 may be provided coupled to the plug sensing circuit 201 to switch the housing microphone 128 on or off.

Figure 3:
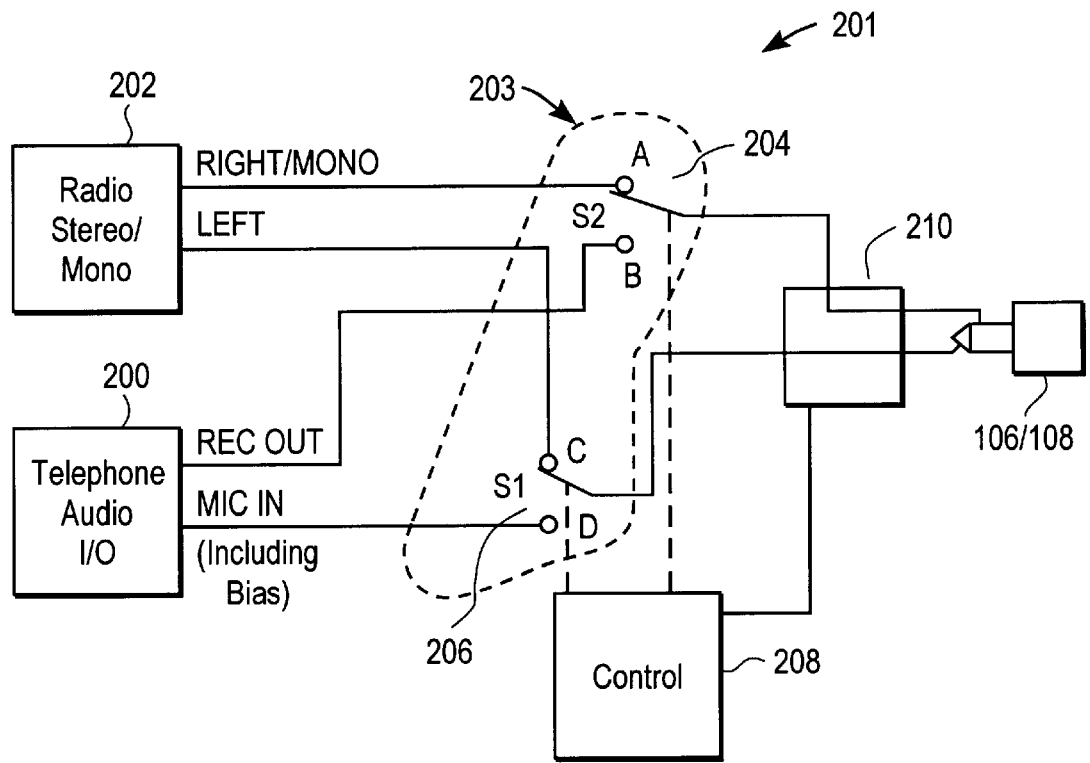
FIG. 3 is a block diagram of jack sensing circuitry according to an embodiment of the present invention.
Figure 4:
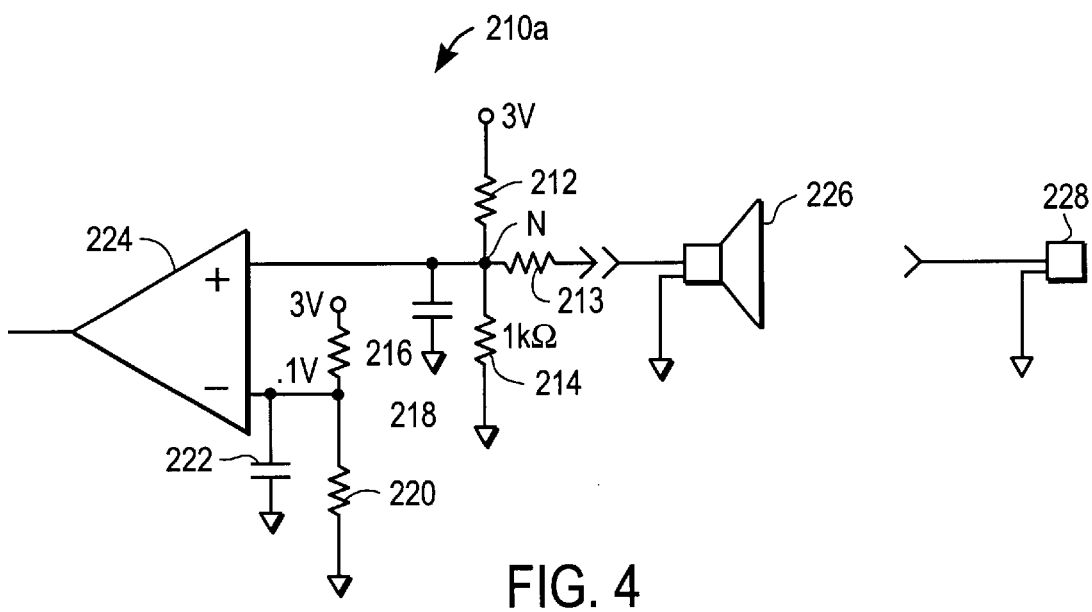
FIG. 4 is a diagram illustrating a sensing circuit for use in an embodiment of the present invention.

Turning now to FIGS. 3 and 4, the plug sensing circuit 201 is illustrated in greater detail. In particular, as discussed above, the plug sensing circuit 201 includes a sensor 210 and a switching unit 203. The switching unit 203 includes a first switch 204 and a second switch 206 coupled between the sensor 210 and the cellular telephone unit 200 and the radio unit 202. It is noted that while the switches 204, 206 are illustrated as conventional switches, any type of switching circuitry, such as field effect transistors, or other logic circuitry may be employed. The switch 204 has a contact A coupled to the right stereo or mono input of the AM/FM radio unit 202, and a second contact B coupled to the receiver output of the cellular telephone unit 200. The switch 206 includes a contact C coupled to the left stereo output of the AM/FM radio unit 202 and a second contact D coupled to the microphone input of the telephone unit 200.

As discussed above, the sensor 210 is configured to detect the presence of a plug for a cellular phone 106 or a plug for a stereo headset 108. If a plug 106 from a stereo headphone 101 is detected, the switch 204 will be in position A and the switch 206 will be in position C. If a telephone call is received (or an outgoing call is made) while the plug 106 is being detected by the sensing circuit 210, the control processor 208 may connect the housing microphone 128 (FIG. 2) by way of a switch 262 (FIG. 2) to cause a microphone input to be provided to the cellular telephone unit 200. In addition, the switch 204 may be switched to the B position, so as to provide telephone output on a single channel of the stereo headphone 101.

If the sensing circuit 210 detects the presence of a plug 108 from a telephone headset 103, then the switch 204 will be maintained in the A position and the switch 206 will be maintained in the D position in the event that an outgoing or incoming telephone call is detected. However, if the radio is being used, the control processor 208 and the sensor 210 will maintain the switch 204 in the A position and the switch 206 in the C position.

The sensor 210 includes a sensor or channel detection circuit for each of the channels (i.e., one for right and left stereo, and microphone input and audio output. Only one such channel detection circuit is shown in FIG. 4). In particular, the sensing is done on both channels; if both channels are at a low impedance, then a stereo headphone is installed. If only one channel is at low impedance, then the other channel is the microphone input and a telephone headset is installed. If neither channel is at low impedance, then the system assumes that nothing is installed.

In particular, stereo headphones are characterized by two 8-ohm receivers. In contradistinction, the telephone headset is characterized by one 8-ohm channel (audio output) and one high impedance (>10 K$\Omega$) channel for the microphone (i.e., one for left and one for right channels. An exemplary sensing circuit for sensing one channel is shown in FIG. 4. A reference voltage is provided from a 3V source and resistors 218, 220 and capacitor 222 are provided to the negative input of a comparator 224. The resistor values are chosen to provide a 0.1V reference to the negative input of the comparator 224. A similar network is provided to the positive input of the comparator 224. In particular, a 3V source is provided to a resistor 212 and a capacitor 216 in parallel with a resistor 214 coupled to ground. In addition, a resistor 213 is provided at the plug input. Absence of a headpiece (or presence of the microphone) will provide a first voltage at node N (i.e., comparator input) responsive to high impedance, and presence of a headpiece will provide a second voltage (responsive to low impedance).

The invention described in the above detailed description is not intended to be limited to the specific form set forth herein, but, on the contrary, it is intended to cover such alternatives, modifications and equivalents as can reasonably be included within the spirit and scope of the appended claims.

What is claimed is:

1. An electronic device, comprising:
   a radio controller, said radio controller configured to provide radio functionality;
   a communications controller configured to provide telephone functionality;
   a jack circuit including a jack configured to receive a plurality of plugs for headpieces associated with said radio controller and said communications controller, and configured to detect a plug associated with said radio controller and a plug associated with said communications controller; and
   a switching unit, including a first switch adapted to automatically switch between a first radio output and a telephone output and a second switch adapted to automatically switch between a second radio output and a telephone input depending on whether a radio controller plug or a communications controller plug is detected as being installed in said jack.

2. An electronic device as recited in claim 1, said jack circuit configured to switch between radio and telephone functionality.

3. An electronic device as recited in claim 2, wherein said jack circuit is configured to distinguish between an speaker and a microphone.

4. An electronic device as recited in claim 2, wherein said jack circuit includes a first channel detection circuit and a second channel detection circuit.

5. An electronic device as recited in claim 4, wherein said first channel detection circuit is configured to provide a first output when a telephone headset is installed in said jack and a second output when stereo headphones are installed in said jack.

6. An electronic device as recited in claim 4, wherein said first and second channel detection circuits include a comparator.

7. An electronic device as recited in claim 4, said jack circuit configured to switch between said radio and telephone functionality depending on outputs from said first and second channel detection circuits.

8. An electronic device, comprising:
    a radio controller, said radio controller configured to provide radio functionality;
    a communications controller configured to provide telephone functionality; and
    a jack circuit including a jack configured to receive a plurality of plugs for headpieces associated with said radio controller and said communications controller, and configured to detect a plug associated with said radio controller and a plug associated with said communications controller said jack circuit including a first channel detection circuit and a second channel detection circuit and configured to switch between said radio and telephone functionality depending on outputs from said first and second channel detection circuits;
    said jack circuit configured to switch between radio and telephone functionality responsive to detecting a telephone call.

9. A detection circuit for use in an electronic device, said detection circuit comprising:
    first means for detecting a first type of device plugged into said jack;
    second means for detecting a second type of device plugged into said jack; and
    a switching circuit responsive to said first and second detecting means for switching between first and second functionality to said jack depending on whether said first type of device or said second type of device are detected and upon detecting a telephone call.

10. A detection circuit as recited in claim 9, wherein said first type of device is a stereo headphone.

11. A detection circuit as recited in claim 10, said second means including means for detecting a microphone.

12. A detection circuit as recited in claim 9, wherein said first type of device is a telephone headset.

13. A detection circuit as recited in claim 12, said detecting means including a comparator.

14. A detection circuit as recited in claim 9, said first means including means for detecting a speaker.

15. A detection circuit as recited in claim 14, said detecting means including a comparator.

16. A detection circuit for use in an electronic device, said detection circuit comprising:
    circuitry adapted to detect first or second types of devices plugged into a jack; and
    a switching circuit responsive to said circuitry for switching between first and second functionality to said jack depending on whether said first type of device or said second type of device are detected and upon detecting a telephone call.

17. An electronic device, comprising:
    a radio controller, said radio controller configured to provide radio functionality;
    a communications controller configured to provide telephone functionality; and
    a jack circuit including a jack configured to receive a plurality of plugs for headpieces associated with said radio controller and said communications controller, and configured to detect a plug associated with said radio controller and a plug associated with said communications controller.

* * * * *